US008856128B2

(12) United States Patent
Zasman et al.

(10) Patent No.: US 8,856,128 B2
(45) Date of Patent: *Oct. 7, 2014

(54) SYSTEM AND METHOD TO RESEARCH DOCUMENTS IN ONLINE LIBRARIES (71) Applicant: Zoom Catalog, LLC, Lafayette, CO (US)

(72) Inventors: Noleen Zasman, Lafayette, CO (US); Gary I. Zasman, Lafayette, CO (US); David Sanborn, Castle Rock, CO (US)

(73) Assignee: Zoom Catalog, LLC, Lafayette, CO (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/790,030

(22) Filed: Mar. 8, 2013

(65) Prior Publication Data

US 2013/0191375 A1 Jul. 25, 2013

Related U.S. Application Data (63) Continuation of application No. 12/877,781, filed on Sep. 8, 2010, now Pat. No. 8,407,197.

(60) Provisional application No. 61/240,400, filed on Sep. 8, 2009.

(51) Int. Cl.
*G06F 17/30* (2006.01)
(52) U.S. Cl.
CPC .... *G06F 17/30554* (2013.01); *G06F 17/30011* (2013.01); *G06F 17/30864* (2013.01)
USPC .......................................... 707/737; 707/769
(58) Field of Classification Search
USPC .................................................. 707/769, 737
See application file for complete search history.

(56) References Cited

U.S. PATENT DOCUMENTS

| 7,181,462 B2 | 2/2007 | Shalabi et al. | |
| 7,228,530 B2 * | 6/2007 | Imai | 717/144 |
| 7,559,906 B2 * | 7/2009 | Bugo | 601/90 |

(Continued)

FOREIGN PATENT DOCUMENTS

KR 20080028031 A 3/2008

OTHER PUBLICATIONS

International Search Report PCT/US20101048148 dated Apr. 19, 2011, pp. 1-3.
Written Opinion PCT/US2010/048148 dated Apr. 19, 2011, pp. 1-4.

(Continued)

*Primary Examiner* — Baoquoc N To
(74) *Attorney, Agent, or Firm* — Perkins Coie LLP (57) ABSTRACT A method and system for storing and searching digital documents, such as digital catalogs, are described. The method in one embodiment comprises inputting digital documents, extracting content from the digital documents, and storing the extracted content in a database so that the content is searchable. The method can include generating a hierarchy of unique database and CMS objects from document covers and pages plus meta data. The method can further include receiving a search query from a user and, in response, identifying content extracted from one of the digital documents and stored in the database, which satisfies the query. The method can further include causing a result set to be output to the user, where the result set includes the identified content which satisfies the search query and an image of a particular page of the digital document from which the identified content was extracted.

23 Claims, 5 Drawing Sheets

(56) References Cited

U.S. PATENT DOCUMENTS

| | | | |
|---|---|---|---|
| 7,599,906 B2* | 10/2009 | Kashiwagi et al. | 1/1 |
| 7,711,702 B2* | 5/2010 | Smolen et al. | 707/715 |
| 7,711,703 B2* | 5/2010 | Smolen et al. | 707/609 |
| 7,783,596 B2* | 8/2010 | Smolen et al. | 707/609 |
| 7,886,274 B2* | 2/2011 | Imai | 717/124 |
| 8,200,025 B2* | 6/2012 | Woodbeck | 382/224 |
| 2001/0043742 A1 | 11/2001 | Melen | |
| 2003/0149968 A1* | 8/2003 | Imai | 717/156 |
| 2005/0080713 A1 | 4/2005 | McHale et al. | |
| 2005/0188057 A1 | 8/2005 | Joo | |
| 2006/0095345 A1* | 5/2006 | Ka et al. | 705/27 |
| 2007/0174246 A1 | 7/2007 | Sigurdsson et al. | |
| 2007/0209033 A1* | 9/2007 | Imai | 717/144 |
| 2007/0253678 A1 | 11/2007 | Sarukkai | |
| 2007/0260476 A1* | 11/2007 | Smolen et al. | 705/1 |
| 2007/0260620 A1* | 11/2007 | Smolen et al. | 707/100 |
| 2007/0260621 A1* | 11/2007 | Smolen et al. | 707/100 |
| 2008/0005194 A1* | 1/2008 | Smolen et al. | 707/202 |
| 2009/0148068 A1* | 6/2009 | Woodbeck | 382/305 |
| 2009/0183115 A1 | 7/2009 | Iwasaki | |
| 2010/0262514 A1* | 10/2010 | Westphal | 705/27 |
| 2011/0022462 A1 | 1/2011 | Collins et al. | |
| 2011/0158538 A1* | 6/2011 | Iwamoto et al. | 382/192 |

OTHER PUBLICATIONS

Co-Pending U.S. Appl. No. 12/877,781 of Zasman, N., et al., filed Sep. 8, 2010.

Non-Final Office Action Mailed Mar. 15, 2012 in Co-Pending U.S. Appl. No. 12/877,781 of Zasman, N., et al., filed Sep. 8, 2010.

Final Office Action Mailed Oct. 2, 2012 in Co-Pending U.S. Appl. No. 12/877,781 of Zasman, N., et al., filed Sep. 8, 2010.

Notice of Allowance Mailed Jan. 23, 2013 in Co-Pending U.S. Appl. No. 12/877,781 of Zasman, N., et al., filed Sep. 8, 2010.

* cited by examiner

| Catalog/Doc Name | E.g. leedsumbrellas2010 |
|---|---|
| Catalog Category | Apparel, Badges and Lanyards, Caps and Hats, Eco Friendly, Food and Drink etc. |
| Catalog Theme | Automotive, Beach, Employee Incentive, Religion, Banking, Health, Sports and Fitness etc |
| Company Name | e.g. Leeds |
| Line Name | e.g. IZOD |
| Logo to be added | Upload logo (e.g. can be used to rebrand catalog) |
| Video/Audio to be added | Upload vide/audio |
| Virtual sample to be added | Upload virtual sample |
| Preferences | Can select from Add search, add print, add email, add snipping tool, add logo, add slideshow etc. |
| Product Compliancy Information | Compliance |
| Safety | Product Safety Information |
| Other | Determined by Industry |

SYSTEM AND METHOD TO RESEARCH DOCUMENTS IN ONLINE LIBRARIES

SYSTEM AND METHOD TO RESEARCH DOCUMENTS IN ONLINE LIBRARIES

This application is a continuation of U.S. patent application Ser. No. 12/877,781, filed on Sep. 8, 2010, which claims the benefit of U.S. Provisional Patent Application No. 61/240,400, filed on Sep. 8, 2009, which are incorporated herein by reference.

FIELD OF THE INVENTION

At least one embodiment of the present invention pertains to computer-based storage and search, and more particularly, to a method and corresponding system for aggregating, organizing, storing and searching digital documents.

BACKGROUND

Product manufacturers, suppliers, distributors and consumers have access to thousands of product images and related product information dispersed via paper catalogs, the internet and other mediums. Users have to rely on multiple web sites, online and offline applications and storage devices to research products, services and promotional materials. This process is difficult and inefficient, as it slows down the sales process and makes finding new, creative and cost-effective ideas difficult. Further, end users must page through multiple paper and digital replicas of catalogs to locate products. This process is time consuming and laborious.

SUMMARY

This summary is provided to introduce in a simplified form certain concepts that are further described in the Detailed Description below. This summary is not intended to identify essential features of the claimed subject matter or to limit the scope of the claimed subject matter.

A method and corresponding system for aggregating, storing and searching digital documents are disclosed. The documents can be, for example, digital catalogs of products or services, maintenance manuals, etc. The method, in one embodiment, comprises inputting digital documents, extracting content from the digital documents, and storing the extracted content in a database so that the content is indexed and searchable. The method further includes receiving a search query from a user and, in response, identifying content extracted from one of the digital documents and stored in the database, which satisfies the query. The method further includes causing a result set to be output to the user, where the result set includes the identified content which satisfies the search query and an image of a particular page of the digital document from which the identified content was extracted.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
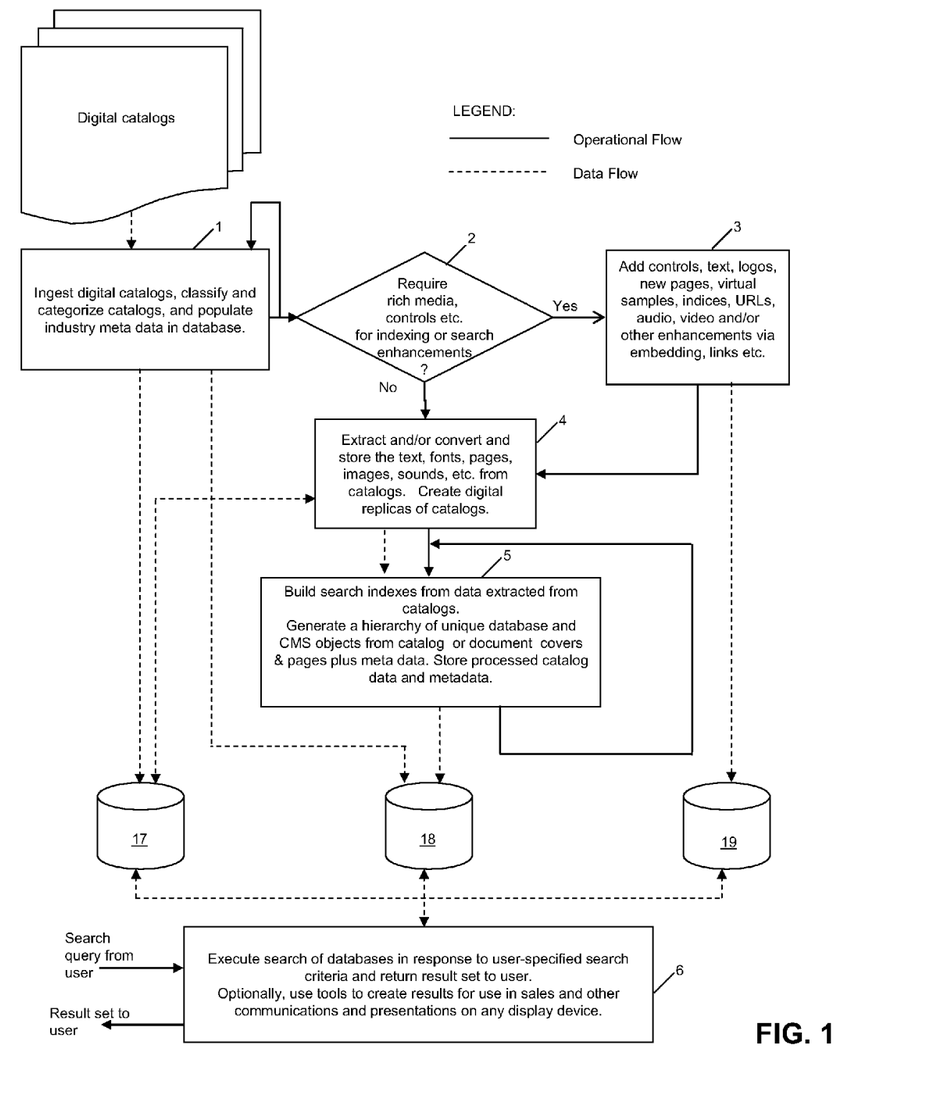
FIG. 1 illustrates an example of a processes to index, classify, replicate and enhance digital catalogs and/or other documents for online aggregation, search, research, presentations, viewing, product research and other applications.

Embodiments of the present invention generally relate to a system and technique to index, classify, replicate and enhance digital catalogs of products and/or services, and/or other digital documents stored in computer based libraries, for online aggregation, search, product research and/or other web based applications, which can be customized for a specific industry. FIG. 1 illustrates an example of a process in accordance with the technique introduced here. In FIG. 1, solid lines represent operational flow, whereas dashed lines represent data flow. The operations in FIG. 1 can be performed by an appropriately programmed computer or other type of processing system. Note that while digital catalogs are mentioned here as an example of digital documents that are processed according to the technique introduced here, the technique alternatively (or additionally) could be applied to essentially any other type of digital document.

In FIG. 1, at step 1 the system ingests or locates digital catalogs made available on the world wide web, one or more file systems, FTP servers and/or storage media (e.g., CD-ROM, DVD, flash drive, etc.), or made available to any program that file transfers or locates such documents. A digital catalog may be in the form of a PDF or HTML document, for example. In addition, the system classifies and categorizes the ingested catalogs by using an industry taxonomy, e.g., by supplier name, line name, etc. The system then populates industry-specific metadata resulting from this classification into a data store 17. Data store 17 generally is for storing content, such as ingested digital catalogs, digital replicas of catalogs, and individual pages of digital catalogs. Examples of industry-specific metadata are described below. This step may repeat, for example, periodically, or in response to a predefined schedule or triggering event.

In step 1, either the system or a human administrative user can ingest digital catalogs into the system, or the system can automatically locate and obtain these documents from the internet or file systems, physical storage media (e.g., CDs, DVDs, flash drives, hard disks), scanners or any other source. Once this is done, the digital catalog is in the system and can be processed with multiple algorithms.

In the substep of classifying and categorizing the ingested catalogs, data can be added to the system that describes the taxonomy within which the catalog operates, e.g., suppliers, themes, or categories, or a specific taxonomy defined by a particular industry.

The ingestion substep can have multiple possible implementations, as the catalog may be ingested as a file or located on the web at another URL. In another embodiment the catalog may be constructed from a virtual sample on-the-fly.

At step 2 the system determines whether any rich media, controls or other text for indexing or search enhancements are required. If so, the process continues to step 3; if not, the process skips ahead to step 4.

At step 3 the system adds controls (email, snip images, etc.), text, logos, new pages, virtual samples, indexes, uniform resource locators (URLs), audio, video and/or other enhancements, via embedding, links, extracting images using image processing etc. These content are stored in a data store 19. Data store 19 can contain, for example, external rich media (virtual samples) and tools (including links) and/or any other media, tools and/or rights added to a digital catalog or digital replica of a digital catalog. At step 3, external rich media (e.g., virtual samples) and tools (e.g., links) and/or any other media, tools or rights can be added to data store 19 for any digital catalog or document replica. Other content such as virtual samples, digital rights management (DRM) metadata, etc. can be linked into database 19 as needed. For example, a database of virtual samples can be loaded, and links within the catalog can be placed over the products to activate the virtual sample access for editing and visualizing addition of logos to products, changing product colors, etc. A virtual sample is a less expensive alternative to a physical product sample. It is a digital sample/mockup image created to show how the product will look in a particular color or view, or with a particular logo, design or typeset, etc. Virtual samples and other related media can be stored in digital media and linked via the catalog for access, customization and distribution.

At step 4 the system extracts content from each digital catalog, such as its text, fonts, pages, images, sounds, etc., and readies this content for placement in data store 17. In this step the system also can create a digital replica of each catalog. Creating a digital replica may include preparing a pageable image of each catalog in one or more formats, so that it is viewable on one or more different types of user devices, such as desktop computers, laptop/notebook/tablet computers, kiosks, televisions, handheld devices such as smartphones, etc. Creating a digital replica may further involve ensuring that catalog pages are saved in various formats (e.g., any one or more of JPEG, PNG, PDF) for the catalog pages, ensuring that the replica is of appropriate size and quality, and performing tests to ensure that a user device of a given type will perform well when displaying the replica.

At step 5 the system builds search indexes from the data (e.g., text and/or rich media) extracted from the catalogs. The search indexes associate each item of extracted data with the particular catalog page(s) or image(s) from which it was extracted, and in at least some cases, with other added metadata, pointers to associated catalogs, web sites or media e.g. product demo videos, virtual samples etc. The search indexes are stored in data store 18. Data store 18 generally is for storing industry metadata and indexes and the hierarchy of unique database and CMS objects representing each catalog in the database. Data store 18 stores, among other things, industry-specific metadata and search indexes (created from unique objects by the search engine), added and extracted catalog data, pointers to pages with search match, pointers to rich media, categories and classifications.

The search indexes can include data from catalogs, data from data entry, taxonomy data and metadata, pointers to catalogs, etc., to enable subsequent search.

The search indexes in data store 18 can include data extracted from all of the media managed by the system as well the combination of some or all of the industry-specific metadata. For example, the search indexes can include:

1) Text extracted from the ingested catalog pages that were arranged in a hierarchy of enterprise content management (ECM)/database objects so that catalogs can be managed individually and collectively.

2) Industry-specific metadata used to search for specific catalogs and catalog pages (e.g., categories, themes, supplier, line names, logo information, virtual samples and related information, etc.).

3) Text extracted from the catalogs, assembled by the system from catalog pages.

4) Text extracted from rich media included in the catalog pages (e.g., product videos and images).

5) Any other text and/or numerics that can be associated with the information on a catalog page, e.g., rights information, compliancy information, product safety information, product price information, product specifications, image processing information, etc.

Also at step 5, the system generates a hierarchy of unique database and CMS objects to represent each catalog, from each catalog's cover and internal pages plus metadata. In one embodiment, for each catalog a parent object is created in this hierarchy to store the catalog's cover and related catalog data (e.g., supplier, seasonal information, go-live date, expiration date) and pointers to each of its child objects. Child objects of a given parent object are created to store pages from the inside of the catalog (including, e.g., text, image, page number) as well as a pointer to the parent object. These objects are stored in data store 18.

Step 5 also populates data store 17 with digital catalog replicas, along with any available associated audio, video and/or other media types embedded or linked to the corresponding replicas. This can include JPEG images, digital catalog replicas, catalog pages, page thumbnail images, zoomed page images, audio, video and/or other types of digital content type. Digital catalog replicas as well as audio, video, web links and other digital media types can be linked to the search indexes in data store 18.

Note that while data stores 17, 18 and 19 are shown as separate data stores, any two or more these data stores could be combined into a single data store.

At the end of step 5, all of the stored information (e.g., search indexes, digital replicas and enhancements) are available to be searched (step 6) in response to a user's search query, to quickly locate and return the exact catalog page(s), text and media or a combination of these) of any catalogs which satisfy the search criteria. A search, and/or the search indexes, can be customized for a particular industry taxonomy. The system can employ tools to create results for use in sales and other communications and presentations on any display device.

Search results are aggregated together into a result set before being transmitted to the user. As further described below, the result set can include a combination or text, numerics, page replicas and other media or a combination of these in numerous configurations and permutations to enrich the search result and make it page-granular. In one embodiment the result set provides a page replica and rich media in numerous configurations. Additional text snippets resulting from the search can also be displayed, if desired.

Figure 2:
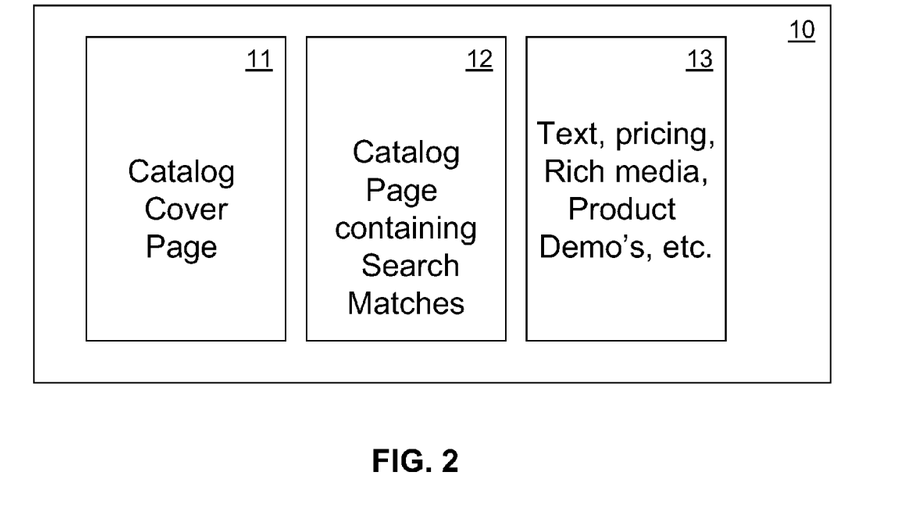
FIG. 2 shows an example of the display of a search result set produced by an embodiment of the system, introduced here.

Search results from the search indexes or words, pages and other media can be combined in any combination to provide fast access to the exact page(s), text or rich media or a combination of these, as illustrated in FIG. 2. FIG. 2 shows an example of a simple search result set as it may be displayed to a user, and this can be enhanced with faceted search results.

Faceted search is a set of web parts that provide an intuitive way to refine search results by category (facet).

In the illustrated format, the search result set 10 includes a thumbnail image 11 of the catalog cover, a thumbnail image 12 of the particular page or image that contains the content that satisfied the search criteria, and a display region 13 containing snippets of text, rich media, product demos and/or other content that satisfy the search criteria. In actual use, a given search result set can contain multiple instances of the items shown in FIG. 2, e.g., if multiple catalogs each produced a hit on the search criteria. In one embodiment, such multiple instances can be arranged vertically as displayed to the user, for example, so that the catalog cover thumbnail images 11 form a column on the left, the internal page thumbnail images 12 form a column in the middle, and the snippets display region 13 form a column on the right. Alternatively, any other convenient display arrangement or format can be used.

Note that FIG. 1 shows one embodiment of a relationship among the various process steps. In other embodiments, the order of many of the steps may be changed. For example, the step of index population may occur before classification and categorization and conversion. Further, the step of populating search indexes could occur before creating digital replicas. Additionally, certain steps may be omitted in certain embodiments. For example, ingestion of a catalog at step 1 could be omitted if the catalog is located and processed in a different location, such as another web URL or other repository or media. Also, classification and categorization of catalogs according to an industry taxonomy may not occur if this data is not needed. Further, addition of virtual samples and other rich media and storage of virtual samples may be omitted if that data is not needed.

In another embodiment the steps of populating the search indexes, and storing the catalogs and virtual samples could be altered or adjusted so that, if the step only requires populating indexes, the catalog storage and virtual sample storage may not occur.

As another example, the embodiment shown represents an embodiment that may be implemented by a computer, smartphone, PDA and/or other type of machine. However, in some embodiments, at least some of the above-described operations can be assisted by a human operator. For example, after the step of ingestion a human operator could execute the extraction of text, etc., assisted by a program as well as the conversion assisted by a program.

Further, in one embodiment the classification and categorization can be done using data entry by a human operator or programmatically by a computer program based on created or pre-defined taxonomies.

Figure 3:
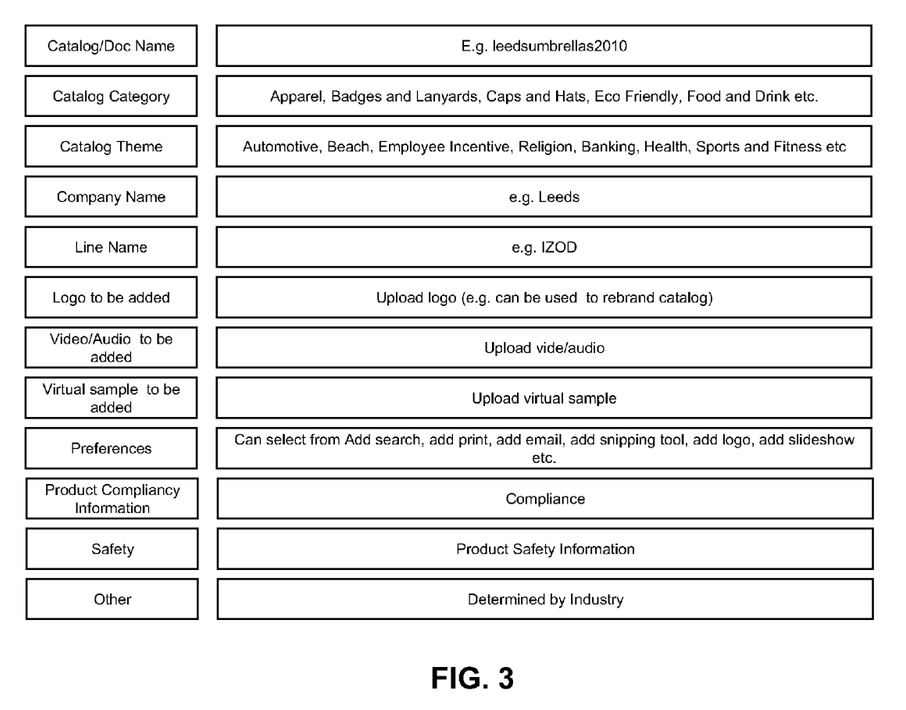
FIG. 3 illustrates an example of industry-specific metadata and content that can be used to enrich and speed up research and enhance presentation and that can be added during catalog ingest and classification or during research.

FIG. 3 illustrates an example of industry-specific metadata and content that can be used to enrich and speed up research and enhance presentation and that can be added during catalog ingest and classification or during research. Industry-specific metadata and various types of rich media can be added to digital catalog replicas of catalogs, for example. The digital replicas may use, for example, Flash, HTML or other mechanisms to emulate page turning or presentations and may vary depending on the display device. The metadata can be used to enrich the content indexing/search by giving the user alternative ways to research digital catalogs and products. The rich media can be used to enhance product research and the resulting presentation that can be created from the combination of the digital catalog and rich media or snippets of these.

Examples of industry-specific metadata and rich media can include:

Catalog/Doc Name: This gives each catalog (or other document) a unique name that enables all of its pages and rich media to be managed under one parent object (e.g., a supplier may have an annual and a seasonal catalog for which the names differ).

Catalog category: Allows the categorization of digital catalogs by industry-specific categories. For example, if the user is searching for apparel, he could narrow his research by searching for only those catalogs that have been categorized as apparel as having apparel products and ideas. This helps narrow and speed up research to only digital catalogs with apparel products and ideas.

Catalog theme: Allows association of themes to digital catalogs. For example, if the user is searching for a beach theme, then he could narrow his research by searching for only those catalogs that have been themed as having beach products and ideas. This helps narrow and speed up research to only digital catalogs with beach products and ideas.

Company Name: Allows associating aggregated catalogs by company names to digital catalogs. For example, if the user is searching for a company name such as SanMar, then he could narrow his research by searching for only SanMars catalogs. This helps narrow and speed up research to only digital catalogs with products and ideas of that company.

Line Name: Allows associating line names to digital catalogs. For example, if the user is searching for a line name such as Nike, then he could narrow his research by searching for only those catalogs that have Nike products and ideas. This helps narrow and speed up research to only digital catalogs with products and ideas associated with that line name.

Logo (or image) to be added: This allows the system or end-user to upload a logo (image) and for it to be applied to catalogs for the purposes of branding and re-branding the catalogs for use by sales companies, stores and people who represent the catalog supplier.

Video/Audio to be added: This allows the system or end-user to upload video and audio to be applied to catalogs for the purposes of enhancing the products in the catalogs and enriching research as well as to be used in presentations and communication.

Virtual samples to be added: This allows the system or end-user to upload images to be applied to catalogs for the purposes of enhancing the product research, and these can be used in presentations and communication. A virtual sample is a less expensive alternative to a real product sample. The digital sample/mockup is created to show how the product will look in a particular color, view or orientation, or with a particular logo, design, typeset, and such a mockup can be used in presentations and communications.

Preferences: The end-user can select his preferences with a digital catalog. For example, a researcher can select form a range of tools and features that may accompany a digital catalog, such as image editing tools, video editing tools, audio recording, email, print, etc., to allow the researcher to build his presentation or communication from the digital catalog.

One embodiment of the above-described system and process works as follows. Digital catalogs in multiple formats are ingested into the system or located on the web, DVD, file system and other media, both electronically and by human intervention. The system or operator then runs a conversion software program which creates a digital replica of each catalog for later population of the data store 17. Once the digital catalog is ingested or located, the text on each page is extracted for later insertion into the search index in data store 18. This catalog is loaded into the system after passing a quality control process, where the catalog can be sensed as a new addition for loading the digital catalog replica into data store 17 as well as loading its search indexes into the search index in data store 18. The operator or a program can then classify and categorize the catalogs with industry-specific data based on the created taxonomy or a predefined taxonomy used in that particular industry. Additionally, the digital catalog replicas may be enhanced with virtual samples and associated with a data store 19 of virtual samples, digital rights data and/or data of other types. Additionally, catalogs can be assembled on-the-fly from the digital samples and other data in the system.

An embodiment of this system thereby enables ingestion, indexing, classification, replication and enhancement of digital replicas of catalogs to speed up search to the exact page or location in a catalog that matches a user's search criteria. It can eliminate having to page through hundreds of digital replicas of catalogs to locate products, text and rich media.

An embodiment of the system can be used to build aggregated digital catalog portals on the web or standalone applications to enable fast search and location of digital catalogs, products in the catalogs, and products on specific pages of the catalogs across one or all catalogs stored in the system.

In one embodiment, the travel industry could use this technique to house, store and index many travel brochures and associated media; or, the motor industry could use this technique to store and index many parts catalogs, product demo's and other media for multiple part manufacturers.

An embodiment of the system can used in both web and offline (e.g., CD-based) applications across multiple industries and devices such as computers, smartphones, PDAs, kiosks, etc.

An embodiment of the system can used to create other types of catalogs e.g., price point catalogs, special catalogs, premium catalogs and many other types of aggregated catalogs. The aggregated catalogs and indexes might be used for others to build and brand their own web sites that employ the above-described system, using their own branding. As another example, the aggregated catalogs and indexes can be distributed through social media, such as Facebook, MySpace, etc.

The above-described system and technique can be used as a tool to quickly find multiple media content, which can be used to build sales presentations, for example.

Figure 4:
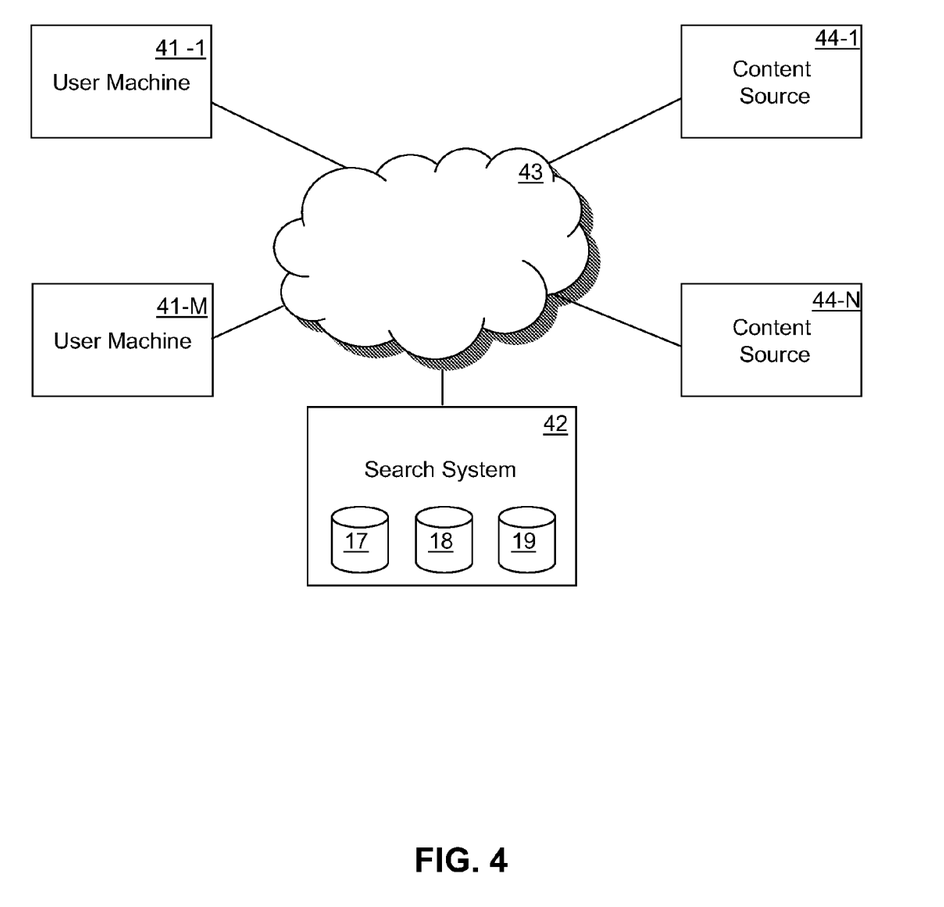
FIG. 4 illustrates an example of a network environment in which the technique and system introduced here can be implemented.

FIG. 4 illustrates an example of a network environment in which the technique and system introduced above can be implemented. The technique introduced above can be implemented in a search system 42 that is connected to a network 43. In one embodiment, the search system 42 is embodied as one or more conventional server-class computers (the search system 42 may be implemented in a single computer or device, or it may be distributed between two or more computers or devices). In other embodiments, the search system 42 can be or include one or more devices of various other types, such as a personal computer, PDA, smartphone, kiosk, etc. As shown, the search system 42 includes data stores 17, 18 and 19. The network 44 may be or include a global area network such as the Internet, a wide area network (WAN), a metropolitan area network (MAN), a local area network (LAN), or any combination thereof.

The search system 42 may obtain digital catalogs from one or more content sources 44-1 . . . 44-N via the network 43. A content source 44 may be, for example, a web server or FTP server. One or more users operate user machines 41-1 . . . 44-M to access the search system 42 via the network 43. A user machine 41 can be, for example, a conventional personal computer, tablet, laptop or notebook computer, smartphone, PDA, etc. In one embodiment, the user machine 41 accesses the search system 42 using standard protocols, such as transmission control protocol over Internet protocol (TCP/IP) and/or hypertext transfer protocol (HTTP).

Figure 5:
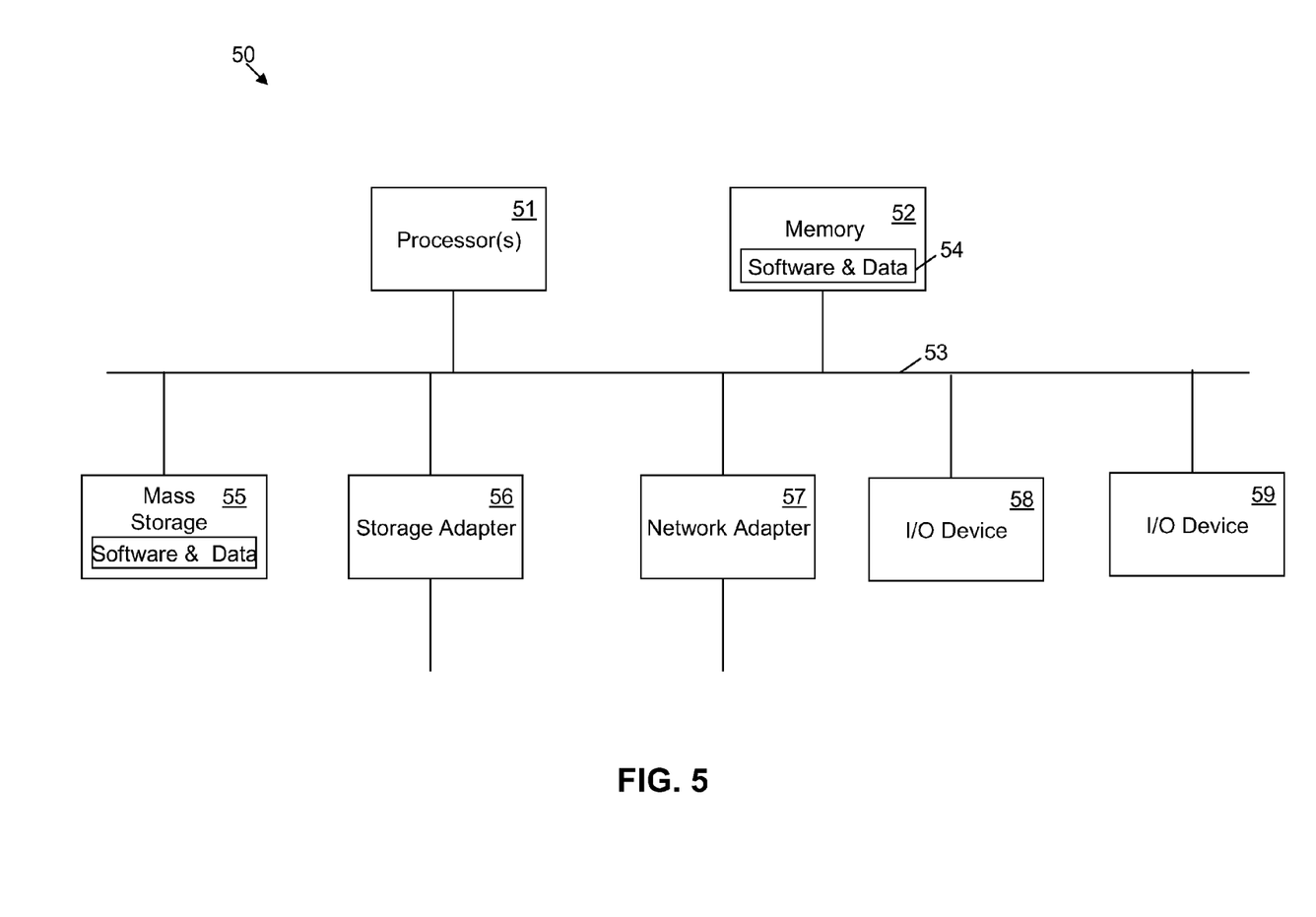
FIG. 5 illustrates an example of a processing system in which the technique and system introduced here can be implemented.

FIG. 5 illustrates an example of the architecture of a computer system that may embody the search system 42. As shown, the computer system 50 includes one or more processors 51 and memory 52, each coupled to an interconnect 53. The interconnect 53 is an abstraction that represents any one or more separate physical buses, point-to-point connections, or both connected by appropriate bridges, adapters, or controllers. The interconnect 113, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 ("Firewire") bus.

The processor(s) 51 may be or include the CPUs of the processing system 50 and, thus, control the overall operation of the processing system 50. In certain embodiments, the processor(s) 51 accomplish this by executing software and/or firmware stored in memory, such as memory 52. Each processor 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 52 is or includes the main memory (working memory) of the processing system 50. The memory 52 represents any form of storage media, such as random access memory (RAM), read-only memory (ROM), flash memory (as discussed above), or the like, or a combination of such devices. In use, the memory 52 may contain, among other things, software and/or firmware code and data 54 to cause operations such as described above to be performed.

Also connected to the processors 51 through the interconnect 53, in the illustrated embodiment, are one or more mass storage devices 55, a network adapter 56 and a storage adapter 57. The mass storage device(s) 55 may be or include any form of persistent storage media, such as one or more hard disk drives, flash drives, etc. The mass storage device(s) 55 may implement one or more of the above-mentioned data stores 17, 18 and 19. The network adapter 56 provides the processing system 50 with the ability to communicate with remote devices, such as a user machine 41, over a network, such as network 43, and may be, for example, an Ethernet adapter or a Cable modem. The storage adapter 57 allows the processing system 110 to access an external storage subsystem and may be, for example, a Fibre Channel adapter or a SCSI adapter. Note that the storage adapter 57 and other items shown in FIG. 5 may not be present in some embodiments (e.g., if the computer system 50 has no external storage media).

In the illustrated embodiment, the computer system 50 also includes various I/O devices 58, 59. These devices may include any one or more of, for example, input devices such as a keyboard, mouse, trackball, touchpad, microphone, etc.; as well as output devices such as a monitor, speakers, etc.

As noted above, the search system 42 could be implemented as (distributed between) two or more computers such as illustrated in FIG. 5. The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   inputting at a computer system a plurality of digital catalogs of products or services;
   extracting content from the plurality of digital catalogs at the computer system; and
   storing the extracted content in a database so that the extracted content is searchable by a machine, wherein said storing includes generating and storing a hierarchy of unique objects to represent each of the plurality of digital catalogs, and wherein said generating includes defining, for each catalog of the plurality of digital catalogs,
      a parent object to store a front page of the catalog and related catalog data, and
      a plurality of child objects of the parent object, individual child objects of the plurality of child objects each representing a different internal page of the catalog and including content of the corresponding internal page and a pointer to the parent object, the parent object including a pointer to each of the child objects of the parent object.

2. The method of claim 1, further comprising classifying and indexing the extracted content according to a taxonomy that is specific to a particular industry, wherein said particular industry is an industry other than electronic catalogs, and wherein said storing the extracted content in a database so that the extracted content is searchable comprises storing the extracted content in accordance with said taxonomy.

3. The method of claim 1, further comprising:
   receiving at the computer system a search query from a user; and
   in response to the search query,
      identifying, by the computer system, content extracted from one of the digital catalogs and stored in the database, which satisfies the search query; and
      causing a result set to be output to the user, the result set including, in association with each other,
         the identified content extracted from said one of the digital catalogs and stored in the database, which satisfies the search query, and
         an image of a particular page of said one of the digital catalogs from which the identified content was extracted.

4. The method of claim 3, further comprising:
   in response to the search query, identifying, by the computer system, the particular page or image of said one of the digital catalogs from which the identified content was extracted.

5. The method of claim 3, wherein causing a result set to be output to the user comprises sending the result set to a device of the user, for output to the user, and wherein sending the result set to the device of the user comprises:
   sending the result set to the device of the user so as to cause the identified content, the image of the front page, and the image of the particular page of said one of the digital catalogs from which the identified content was extracted, to be displayed in association with each other on a display device used by the user.

6. The method of claim 3, wherein said identifying content, said identifying a result set, and said causing a result set to be output to the user are performed for each of a plurality of different content items that satisfy the search query, and wherein the plurality of different content items are from two or more digital catalogs.

7. The method of claim 3, wherein the result set further includes an image of the front page of said one of the digital catalogs from which the identified content was extracted.

8. The method of claim 3, further comprising:
   enabling the user to page through a digital copy of said one of the digital catalogs from which the identified content was extracted.

9. The method of claim 1, further comprising:
   in response to a user input that selects the image of the particular page of said one of the digital catalogs, enabling the user to page through a complete digital copy of said one of the digital catalogs.

10. The method of claim 3, further comprising:
    uploading a user-provided logo at the computer system; and
    associating the logo with at least one catalog of the plurality of digital catalogs at the computer system, in such a manner that when a user views the result set, the logo will be superimposed on an image associated with the at least one catalog in the result set.

11. A method comprising:
    inputting a plurality of digital catalogs of products or services;
    extracting content from the plurality of digital catalogs;
    classifying and indexing the extracted content according to a taxonomy that is specific to a particular industry, said particular industry being an industry other than electronic catalogs;
    storing the extracted content in a database in a computer system in accordance with said taxonomy, wherein said storing includes generating and storing a hierarchy of unique objects to represent each of the plurality of digital catalogs, and wherein said generating includes defining, for each catalog of the plurality of digital catalogs,
       a parent object to store a front page of the catalog and related catalog data, and
       a plurality of child objects of the parent object, individual child objects of the plurality of child objects each representing a different internal page of the catalog and including content of the corresponding internal page and a pointer to the parent object, the parent object including a pointer to each child object of the parent object;

receiving from a user a search query via a network; and in response to the search query, identifying, by the computer system, content extracted from one of the digital catalogs and stored in the database, which satisfies the search query;

identifying, by the computer system, a particular page of said one of the digital catalogs from which the identified content was extracted; and sending a result set over the network to cause the result set to be output to the user, the result set including, in association with each other, the identified content extracted from said one of the digital catalogs and stored in the database, which satisfies the search query, and an image of the particular page of said one of the digital catalogs from which the identified content was extracted.

12. The method of claim 11, wherein the result set further includes an image of the front page of said one of the digital catalogs from which the identified content was extracted.

13. The method of claim 11, wherein sending the result set to the user comprises:

sending the result set to the user so as to cause the identified content, the image of the front page, and the image of the particular page of said one of the digital catalogs from which the identified content was extracted, to be displayed in association with each other on a display device used by the user.

14. The method of claim 11, further comprising:

performing said identifying content, said identifying a result set, and said sending a result set, for each of a plurality of different content items that satisfy the search query, wherein the plurality of different content items that satisfy the search query are from two or more of the plurality of digital catalogs.

15. The method of claim 11, further comprising:

enabling the user to page through a digital copy of said one of the digital catalogs from which the identified content was extracted.

16. The method of claim 11, further comprising:

in response to a user input that selects the image of the particular page of said one of the digital catalogs, enabling the user to page through a complete digital copy of said one of the digital catalogs.

17. The method of claim 11, further comprising:

uploading a user-provided logo at the computer system; and associating the logo with at least one catalog of the plurality of digital catalogs at the computer system, in such a manner that when a user views a result set corresponding to a search, the logo will be superimposed on an image associated with the at least one catalog in the result set.

18. A processing system comprising:

a network interface through which to receive a search query from a user via a network; and a processor configured to control the processing system to perform operations including inputting a plurality of digital catalogs of products or services;

extracting content from the plurality of digital catalogs;

storing the extracted content in a database so that the extracted content is searchable, wherein said storing includes generating and storing a hierarchy of unique objects to represent each of the plurality of digital catalogs, and wherein said generating includes defining, for each catalog of the plurality of digital catalogs, a parent object to store a front page of the catalog and related catalog data, and a plurality of child objects of the parent object, individual child objects of the plurality of child objects each representing a different internal page of the catalog and including content of the corresponding internal page and a pointer to the parent object, the parent object further including a pointer to each child object of the parent object;

receiving at the computer system a search query from a user; and in response to the search query, identifying, by the computer system, content extracted from one of the digital catalogs and stored in the database, which satisfies the search query; and causing a result set to be output to the user, the result set including, in association with each other, the identified content extracted from said one of the digital catalogs and stored in the database, which satisfies the search query, and an image of a particular page of said one of the digital catalogs from which the identified content was extracted.

19. The processing system of claim 18, wherein said operations further comprise:

classifying and indexing the extracted content according to a taxonomy that is specific to a particular industry, wherein said particular industry is an industry other than electronic catalogs, and wherein said storing the extracted content in a database so that the extracted content is searchable comprises storing the extracted content in accordance with said taxonomy.

20. The processing system of claim 18, wherein the result set further includes an image of the front page of said one of the digital catalogs from which the identified content was extracted; and wherein sending the result set to the user comprises sending the result set to the user so as to cause the identified content, the image of the front page, and the image of the particular page of said one of the digital catalogs from which the identified content was extracted, to be displayed in association with each other on a display device used by the user.

21. The processing system of claim 18, wherein said identifying content, said identifying a result set, and said causing a result set to be output to the user are performed for each of a plurality of different content items that satisfy the search query, wherein the plurality of different content items that satisfy the search query are from two or more digital catalogs.

22. The processing system of claim 18, wherein the operations further comprise:

enabling the user to page through a digital copy of said one of the digital catalogs from which the identified content was extracted.

23. The processing system of claim 18, wherein said operations further include:

uploading a user-provided logo at the computer system; and associating the logo with at least one catalog of the plurality of digital catalogs at the computer system, in such a manner that when a user views a result set corresponding to a search, the logo will be superimposed on an image associated with the at least one catalog in the result set.

* * * * *